United States Patent [19]
Green et al.

[11] 4,083,925
[45] Apr. 11, 1978

[54] METHOD FOR REMOVING FERROUS IRON FROM ALKALI METAL ALUMINATE LIQUOR

[75] Inventors: John A. S. Green, Ellicott City; Sergio A. Loynaz, Baltimore, both of Md.

[73] Assignee: Martin Marietta Aluminum, Inc., Bethesda, Md.

[21] Appl. No.: 669,358

[22] Filed: Mar. 22, 1976

[51] Int. Cl.² .............................................. C01F 7/06
[52] U.S. Cl. .................................... 423/121; 423/122; 423/600; 423/140
[58] Field of Search ............... 423/119, 121, 122, 131, 423/600, 140; 209/5

[56] References Cited
U.S. PATENT DOCUMENTS

| 3,390,959 | 7/1968 | Sibert | 423/119 |
|---|---|---|---|
| 3,445,187 | 5/1969 | Sibert | 423/111 |
| 3,716,617 | 2/1973 | Clku et al. | 423/121 |
| 3,755,531 | 8/1973 | Tsukawaki et al. | 209/5 |

FOREIGN PATENT DOCUMENTS

| 129,649 | 9/1959 | U.S.S.R. | 423/121 |

Primary Examiner—Herbert T. Carter
Attorney, Agent, or Firm—Wilton Rankin; John A. Crowley, Jr.

[57] ABSTRACT

Sufficient anionic polyacrylamide having molecular weight of at least 2,800,000 is contacted with alkali metal aluminate liquor containing ferrous iron until a substantial proportion of the ferrous iron is precipitated, and said precipitate and liquor are separated. The process is particularly useful as an improvement in the Bayer process for preparing alumina from bauxite.

18 Claims, No Drawings

METHOD FOR REMOVING FERROUS IRON FROM ALKALI METAL ALUMINATE LIQUOR

The present invention relates to a method for removing ferrous iron from alkali metal aluminate liquor, and is of particular use as an improvement in the Bayer process for preparing alumina from bauxite ore.

Generally speaking, the method of the present invention may be defined as a process for removing ferrous iron from alkali metal aluminate liquor, comprising maintaining said liquor and sufficient anionic polyacrylaminde having molecular weight of at least 2,800,000 in contact, at 65°–254° C., inclusive, until a substantial proportion of the ferrous iron is precipitated, and separating the precipitated ferrous iron from the alkali metal aluminate liquor.

The Bayer process is an old, well known, and presently used process for preparing or producing alumina ($Al_2O_3$) from bauxite ore.

The Bayer process customarily comprises the steps of (a) ball milling bauxite ore in the presence of recycled spent alkali metal aluminate liquor, (b) desilicating to reduce the silica content of the ore, (c) preheating the bauxite ore, (d) digesting the bauxite ore at about 110°–288° C. and about 200–500 p. s. i. pressure with an aqueous solution of an alkali, for example caustic soda, or a mixture of caustic soda and sodium carbonate-either of which may contain recycled spent alkali metal aluminate liquor, (e) cooling the digested bauxite somewhat and relieving the pressure by passing the digested bauxite through a series of vessels into a final blow down tank, where dilute aqueous alkali metal aluminate liquor (spent liquor) resulting from washing red mud is added, (f) passing the digested bauxite (mud settler feed slurry), comprising alkali metal aluminate liquor, ferrous iron, ferric iron and red mud, into a mud settler, )g) thickening the mud settler feed slurry with starch or other mud settling aid, (h) permitting the red mud to settle to the bottom during an average dwell time of about 4–12 hours in the mud settler, and thereby producing a mud settler overflow portion (clear liquor), comprising alkali metal aluminate liquor containing ferrous iron, and a mud settler underflow portion containing red mud with ferric iron and some alkali metal aluminate liquor containing ferrous iron, (i) washing the red mud before discarding it to recover therefrom some of the alkali metal aluminate liquor (spent liquor) for recycling in the Bayer process, (j) filtering the clear liquor to reduce suspended solids content, (k) cooling the clear liquor, (l) precipitating aluminum trihydrate from the clear liquor, and (m) filtering, washing, and calcinating the precipitated aluminum trihydrate at about 900°–1,200° C. to produce about 99% purity finished alumina.

Iron is an undersirable contaminant in finished alumina. Buyers customarily pay sellers a premium price for alumina with 0.020% or less $Fe_2O_3$, and collect a penalty payment from sellers for alumina with more than 0.030% $Fe_2O_3$.

Ferric iron presents no great problem in alumina production, because nearly all of the ferric iron is settled in the mud settler and removed with the red mud.

However, ferrous iron presents a serious problem in alumina production. We have measured the iron in the alkali metal aluminate liquor of conventional mud settler overflow (clear sodium aluminate liquor), following mud settling, and have found that about 85% of the total iron at that point is ferrous iron. By use of a zeta potential measuring device, we have also found that the colloidal ferrous iron in sodium aluminate liquor is a negatively charged colloid. It is possible that some of the ferrous iron is in solution in sodium aluminate liquor.

Ferrous iron that is not removed from the alkali metal aluminate liquor becomes part of the finished alumina. Our experience indicates that in the Bayer process, as it is conventionally practiced, mud settler overflow having 0.020 gm. $Fe_2O_3$ per liter produces alumina with 0.030% $Fe_2O_3$.

There are several prior art methods for lowering the ferrous iron content of alkali metal aluminate liquors, but each of those of which we have knowledge has disadvantages and limitations.

Those prior art methods are founded on contacting the alkali metal aluminate liquor with iron or substances rich in iron, and afterwards separating the liquor therefrom. For example, hot alkali metal aluminate liquor may be filtered through a filter of many iron balls, and some of the ferrous iron adheres to the iron balls. The disadvantages of that method are very high capital cost of the filter, increased operating cost attributable to filter backwashing, the additional process step, increasing the time cycle of the overall alumina making process because of time required for the filtration step, and down time for filter maintenance and backwashing. Another such prior art method involves adding iron-rich red mud, derived from digestion of Caribbean aluminous ores, to domestic alkali metal aluminate liquor, preferably after the red mud has been removed from the domestic alkali metal aluminate liquor, such addition being in the ratio of about one part of Caribbean red mud to three parts of clear domestic liquor, by volume. The problems of that process are increasing the number of mud removal steps from one to two, and increasing materially the amount of red mud that must be dealt with in the Bayer process, even though red mud handling and disposal are already major problems in the alumina industry.

In the Bayer process, starch has traditionally been added to the alkali metal aluminate liquor (mud settler feed slurry), in the mud settler, to thicken and assist in settling the red mud. During that thickening and settling, nearly all of the ferric iron settles out with the red mud, but only a very small amount of the ferrous iron settles out. For example, the liquid portion of the mud settler feed slurry may contain about 0.025–0.035 gram $Fe_2O_3$/liter, about 85% of that iron content being ferrous iron, and conventional mud settling with the aid of starch lowers the $Fe_2O_3$ by only about 0.002 gram/liter of such liquid portion.

It was known in the United States of America prior to the present invention, and it was practiced in the prior art in the United States of America prior to the present invention, to add a very minute amount of anionic polyacrylamide to the starch (about 1 part anionic polyacrylamide: 250 parts starch) used in the mud settler of the Bayer process, for the purpose of accelerating mud settling. For example, about 0.00024 gram anionic polyacrylamide, calculated as 100% polyacrylamide content, and 0.06 gram starch per liter of mud settler feed slurry were employed in a 650,000 gallon mud settler wherein the average dwell time of the alkali metal aluminate liquor in the mud settler was about 6 hours and the depth from the overflow point of the mud settler to the top of the interface of clear liquor and mud (outlet point of mud settler feed slurry) was about 7 feet. Under those prior art conditions and quantities, the rate of mud settling was accelerated by the anionic polyacrylamide, but the polyacrylamide did not have any significant effect upon ferrous iron removal, and the amount of ferrous iron removal was substantially the same as with starch alone.

The method of the present invention overcomes the above disadvantages and limitations of the prior art, and provides additional advantages as follows.

The following is a more detailed description of the process of the present invention. In the present specification and claims, all parts and percentages are by weight, unless otherwise specified; all molecular weights are on dry basis; and, all parts and percentages of the anionic polyacrylamide are calculated by weight based on 100% anionic polyacrylamide polymer content, unless otherwise specified.

As used herein, the term alkali metal aluminate liquor refers to an aqueous solution of an aluminate of an alkali metal, such as sodium, potassium or lithium, and which liquor may be mixed or dissolved with one or more of red mud, ferrous iron, ferric iron, and the other products of the alkaline digestion of bauxite ores.

We have found that sufficient anionic polyacrylamide, having molecular weight of at least 2,800,000 and preferably 3 million to 5 million molecular weight, and more preferably 4 million to 5 million molecular weight, may be maintained in contact with alkali metal aluminate liquor at 65°–254° C., inclusive, until a substantial proportion of the ferrous iron present in the alkali metal aluminate liquor is precipitated, and that the precipitated ferrous iron may thereafter be separated from the alkali metal aluminate liquor, for example by permitting the precipitated ferrous iron to settle out.

As used in the present specification and claims, the term substantial proportion means more than 25% by weight, and having reference to ferrous iron expressed as $Fe_2O_3$.

The process of the present invention may be conducted separate and apart from the Bayer process, but it is of particular value when employed as an improvement in the Bayer process for preparing alumina from bauxite ore.

Under some conditions, the process of the present invention will lower the ferrous iron content of Bayer alkali metal aluminate liquors by as much as 80%, expressed as $Fe_2O_3$.

When used in the Bayer process, the anionic polyacrylamide may be added to the alkali metal aluminate liquor whenever the liquor is at 65°–254° C., but it is preferably and conveniently added, on a continuous basis, to the mud settler feed slurry in the mud settler tank. If added at that point, it will be suitable to employ 0.003–0.015 grams of the anionic polyacrylamide per liter of mud settler feed slurry. The mud settler feed slurry and the polyacrylamide should remain in contact, within the mud settler, preferably at about 65°–120° C., until a substantial proportion of the ferrous iron is precipitated and settles out from the alkali aluminate liquor into the red mud. The time required for that precipitation and settling varies, depending upon the concentration of anionic polyacrylamide employed, the amount of turbulence within the mud settler, the volume of liquid within the mud settler, and the size and shape of the mud settler, as larger volumes and taller tanks require more time for settlement of the ferrous iron precipitate than do lesser volumes and shorter tanks. Generally speaking, about 4–16 hours of contact is enough time to permit said precipitation and settling in most commercial scale mud settlers, at the above polyacrylamide quantity range. Thus, clear alkali metal aluminate liquor, from which a substantial proportion of the ferrous iron has been removed, passes out of the mud settler as mud settler overflow, and the removed ferrous iron passes out of the mud settler as part of the red mud as mud settler underflow.

In the Bayer process, the red mud which departs the mud settler as mud settler underflow contains some alkali metal aluminate liquor, much of which liquor is customarily recovered as spent liquor by washing the red mud with wash water, such as by means of a countercurrent washer. The recovered spent liquor is then recycled in the Bayer process, as described above. Optionally, and preferably, a sufficient amount of the above described anionic polyacrylamide should be maintained in the water used to wash the red mud, to lessen the amount of precipitated ferrous iron which that wash water would otherwise remove from the red mud and recycle as part of the recovered spent liquor. If one desires to use polyacrylamide in the wash water, the wash water should be at 65°–99° C. and contain 0.0013–0.015 gram anionic polyacrylamide per liter of wash water, the lesser amount being preferred, said polyacrylamide having molecular weight of at least 2,800,000 and preferably 3 to 5 million, inclusive, and more preferably 4 to 5 million, inclusive.

One major advantage of the process of the present invention, as above described, is that it provides a method for lowering the ferrous iron content of alumina without expensive or extensive modification of process or equipment as currently employed in plants in which the Bayer process is used.

Another major advantage is that by use of the present invention, starch may be eliminated totally from the Bayer process. Starch is heavy and bulky, requiring expensive storage space and transportation, and attracts rodents. Moreover, a considerable amount of starch is converted to oxalates in the Bayer process. Those oxalates react with caustic and additional caustic must be supplied in the Bayer process to compensate for the caustic lost by that reaction. Also, starch and those oxalates interfere with the precipitation of alumina hydrate, cause frothing during pumping of alkali metal aluminate liquors, and scaling on precipitation tanks.

Other advantages over the prior art are that the alkali metal aluminate liquor is purer, the red mud is precipitated much faster, the size of the red mud flocculants is increased and its sediment is more compact, and the red mud may be pumped about 5% faster, which shortens the process cycle and increases alumina manufacturing plant output.

As another embodiment of the present invention, and as an improvement in the Bayer process, a sufficient amount of said anionic polyacrylamide may be added to the clear alkali metal aluminate liquor (mud settler overflow), and the clear liquor and polyacrylamide permitted to remain in contact until a substantial proportion of the ferrous iron is precipitated, and the precipitated ferrous iron thereafer separtated from the clear alkali metal aluminate liquor. The temperature for the contact may be 65°–254° C., inclusive, and preferably about 65°–99° C., and 4–16 hours contact time will be sufficient customarily to permit precipitation and separation of the ferrous iron, such as by settling out, the exact time depending on size and shape of the vessel, the volume of liquor, turbulence within the vessel, and concentration of polyacrylamide employed. The amount of said polyacrylamide should be 0.0013–0.015 gram polyacrylamide per liter of clear alkali metal aluminate liquor. When the polyacrylamide is added to the clear liquor (mud settler overflow) there may be used in the mud settler either starch, or anionic polyacrylamide, or starch and anionic polyacrylamide mixture.

Bauxite ore of any type or mixture of types, and containing any amount of iron may be employed in the present invention, for example Boke upper level or lower level, Guyana, Surinam or Weipa.

It will be recognized that existing Bayer processes and plants would need to be modified only very slightly to operate the process of the present invention. For example, in one embodiment feeding starch into the mud settler is discontinued, and feeding the polyacrylamide into the mud settler is substituted. Optionally, and preferably, means for dosing the wash water for the red mud with the polyacrylamide may be installed, In yet a different embodiment, a vessel for containing the mud settler overflow during contact with the polyacrylamide, and means for adding the polyacrylamide to that vessel, is installed.

The following are illustrative embodiments of the process of the present invention.

EXAMPLE 1

Two parallel mud settling circuits were established as follows.

A blend of Guyana, Surinam and Boke upper level bauxites was digested at an average of 186° C. in aqueous NaOH in the conventional manner of the Bayer process, and the digested bauxite was cooled and depressurized by passing it through a series of flash tanks and a blow down tank, and from there into a splitter box, where the digested bauxite (mud settler feed slurry) was divided into two separate continuous streams, each having 1,500 gallons/minute flow. Each such stream was passed in continous flow, at approximately 104° C., into a separate mud settler, each settler having 652,333 gallons capacity, and referred to as Settler A and Settler B.

Into Settler A, in addition to said continuous 1,500 gallons/minute stream of mud settler feed slurry, was also pumped continuously a 0.7% aqueous stock solution of anionic polyacrylamide having molecular weight of 3 million, at room temperature, admixed and diluted continuously with 22.5 gallons/minute of spent alkali metal aluminate liquor at about 90° C. The polyacrylamide flow rate was first set to deliver 0.0035 gram polyacrylamide, calculated as 100% polyacrylamide, per liter of mud settler feed slurry entering Settler A, and gradually doubled to 0.007 gram polyacrylamide. After 44 hours of operation, the system had come to substantial equilibrium at the latter polyacrylamide concentration and feed rate.

Into Settler B, in addition to the other continuous 1,500 gallons/minute stream of mud settler feed slurry, was also pumped continuously a 13 gallons/minute aqueous stream also delivering 0.06 gm. starch and 0.00024 gm. anionic polyacrylamide, having molecular weight of three million, per liter of mud settler feed slurry entering Settler B.

The average dwell time in each mud settler of the liquid which subsequently became mud settler overflow was about 6.5 hours. The depth from the overflow point of each mud settler to the top of the interface of clear liquor and mud in each settler (outlet point of mud settler feed slurry) was about 7 feet.

The contents of each mud settler were maintained at approximately 104° C., and in both settlers there was thickening and settling out of the red mud, and production of mud settler underflow (red mud and liquid) and mud settler overflow (clear alkali metal aluminate liquor).

After 44 hours of operation, and after 48 hours of operation, of the mud settlers as above described, the $Fe_2O_3$ concentrations were as follows: 0.037 gram $Fe_2O_3$/liter of liquid portion of the mud settler feed slurries to Settlers A and B; 0.022 gram $Fe_2O_3$/liter of mud settler overflow from Settler A and 0.034 gram $Fe_2O_3$/liter of mud settler overflow from Settler A and 0.034 gram $Fe_2O_3$/liter of mud settler overflow from Settler B. Thus, the starch solution removed 8% of the total iron of the liquid portion of the mud settler feed slurry, while the process of the present invention removed 41% of the total iron of the liquid portion of the mud settler feed slurry.

After 48 hours of operation, starch solution was discontinued to Settler B, and polyacrylamide feed admixed with spent liquor diluent as described above, flowing at 0.007 gram polyacrylamide per liter of mud settler feed slurry, was substituted for the starch feed, and Settler A was continued in operation on polyacrylamide feed as before. Four hours after switching Settler B to polyacrylamide (after 52 hours of total operation), the $Fe_2O_3$ concentrations were as follows: 0.034 gram $Fe_2O_3$/liter of liquid portion of the mud settler feed slurries to Settlers A and B; 0.017 gram $Fe_2O_3$/liter of mud settler overflow from Settler A; and 0.023 gram $Fe_2O_3$/liter of mud settler overflow from Settler B. Thus, there was stabilization in Settler A at 50% iron removal; and, after 4 hours only of commencing to switch from starch solution to polyacrylamide, the process of Settler B reached 32% iron removal, demonstrating that as polyacrylamide is added to Settler B, the amount of iron removal increases.

After 52 hours of total operation, the polyacrylamide going into each settler was discontinued. Into each settler, separately, was then pumped, continuously, a 13 gallons/minute aqueous stream also delivering 0.06 gm. starch and 0.00024 gm. anionic polyacrylamide, having molecular weight of 3 million, per liter of mud settler feed entering each settler. Each settler continued to receive 1,500 gallons/minute of mud settler feed slurry. After 4 more hours of operation, the $Fe_2O_3$ concentrations were as follows: 0.037 gram $Fe_2O_3$/liter of liquid portion of the mud settler feed slurries to Settler A and B; 0.031 gram $Fe_2O_3$/liter of mud settler overflow from Settler A, and 0.032 gram $Fe_2O_3$/liter of mud settler overflow from Settler B, demonstrating that as the polyacrylamide is withdrawn, the amount of iron removal lessens.

EXAMPLE 2

Mud settler feed slurry, the liquid portion of which contained 0.0143 gram $Fe_2O_3$/liter, was produced by digesting Boke upper level bauxite for one hour at 218° C. with Bayer spent liquor and 50% aqueous NaOH, and cooling the result to about 104° C.

Three separate 1,000 ml. graduated cylinders were equipped with external heating means, and labeled A, B, and C. The distance between the 0 ml. and 1,000 ml. mark on each cylinder was 14 inches (34.3 cms.).

Into cylinder A was placed 7 ml. of 0.1% aqueous anionic polyacrylamide having molecular weight of 3 million (0.007 gm. polyacrylamide). Into cylinder B was placed 10 ml. of 0.1% aqueous anionic polyacrylamide having molecular weight of 3 million (0.01 gm. polyacrylamide). Into cylinder C was placed 0.072 gm. starch. To each cylinder was added, with mixing, enough of the above mud settler feed slurry at about 104° C. to bring the contents of each cylinder to 1 liter, and the contents of the cylinders were allowed to stand, without more mixing, while being maintained at approximately 104° C. for 4 hours. Red mud settled at the bottom of each cylinder and clear liquor collected above the red mud.

The mud settling rate in the starch containing cylinder, cylinder C, was 6 feet/hour; in cylinder A was 15 feet/hour; and in cylinder B was 20 feet/hour.

The resulting clear liquors in cylinder A and B were analyzed separately for $Fe_2O_3$ content 1, 2, 3, and 4 hours after the liquors commenced standing, and the results are shown in the following Table A, demonstrating iron removal by anionic polyacrylamide from alkali metal aluminate liquor.

Table A

| Cylinder | Hours of Settling | Gms. $Fe_2O_3$/Liter Of Clear Liquor |
|---|---|---|
| A | 1 | 0.0064 |
| A | 2 | 0.0064 |
| A | 3 | 0.0064 |
| A | 4 | 0.0024 |
| B | 1 | 0.0069 |
| B | 2 | 0.0059 |
| B | 3 | 0.0047 |
| B | 4 | 0.0047 |

EXAMPLE 3

Guyana bauxite ore was digested with aqueous caustic in the conventional manner at 185° C. to produce mud settler feed slurry, a sample of which was cooled to 99° C., and divided into three portions.

The first portion of mud settler feed slurry was promptly centrifuged, and the resulting hot, clear, supernatant sodium aluminate liquor contained total iron of 0.0240 gram/liter, expressed as $Fe_2O_3$.

Five ml. of 0.1% aqueous anionic polyacrylamide (0.005 gm. polyacrylamide), having molecular weight of 4,000,000 – 5,000,000 was placed into an externally heated 1,000 ml. graduated cylinder having a distance of 14 inches between the 0 to 1,000 ml. marks, and the cylinder was then filled to the 1,000 ml. level with the second portion of mud settler feed slurry at 99° C., and the cylinder contents were maintained standing at 82° – 99° C. for 4 hours, without stirring. Red mud collected at the bottom of the cylinder. The clear sodium aluminate liquor, which collected above the red mud, containing total iron of 0.0178 gram/liter, expressed as $Fe_2O_3$, 2 hours after the cylinder contents commenced standing, and total iron of 00140 gram/liter, expressed as $Fe_2O_3$, 4 hours after the cylinder contents commenced standing.

0.06 gm. starch and 0.00024 gm. anionic polyacrylamide, having molecular weight of 4,000,000 – 5,000,000, were dissolved in a few milliliters of water and placed in a graduated cylinder of the above described type. The cylinder was filled to the 1,000 ml. level with the third portion of mud settler feed slurry at 99° C., and the cylinder contents were maintained standing for 4.5 hours without stirring. Red mud collected at the bottom of the cylinder. The clear sodium aluminate liquor, which collected above the red mud, contained total iron of 0.0240 gm./liter, expressed as $Fe_2O_3$, 2.5 hours after the cylinder contents commenced standing, and total iron of 0.022 gm./liter, expressed as $Fe_2O_3$, 4.5 hours after the cylinder contents commenced standing.

EXAMPLE 4

Clear sodium aluminate liquor (mud settler overflow) was prepared in the conventional manner by digesting a blend of approximately equal amounts of Guyana bauxite ore and Boke upper level bauxite ore in aqueous caustic at about 185° C.; depressurizing and cooling the resulting mud settler feed slurry to 105° C.; feeding the resulting mud settler feed slurry in a continuous 1,500 gallons/minute stream into a 652,333 gallon mud settler; simultaneously feeding into the mud settler a continuous 13 gallons/minute stream of water having dissolved therein enough starch and anionic polyacrylamide, having molecular weight of 2,900,000, to provide 0.06 gram starch and 0.00024 gram of said polyacrylamide per liter of mud settler feed slurry entering the mud settler.

The contents of the mud settler were maintained at about 105° C.; the clear aluminate liquor had a dwell time of about 6.5 hours in the mud settler; the average depth from the overflow point of the mud settler to the top of the interface of clear liquor and mud within the mud settler was about seven feet; and the total iron content of the resulting clear sodium aluminate liquor (mud settler overflow) was 0.014 gram $Fe_2O_3$/liter.

One liter of said clear sodium aluminate liquor was placed at about 105° C. into an externally heated graduated cylinder, having 14 inches distance between the 0 and 1,000 ml. marks, and maintained standing at about 80° – 90° C. for six hours without stirring. The liquor was analyzed for $Fe_2O_3$ content periodically during those 6 hours, and the results are shown in Table B below.

Table B

| Hours of Standing | Gms. $Fe_2O_3$/Liter of Clear Liquor |
|---|---|
| 0 | 0.014 |
| .085 | 0.014 |
| 2 | 0.014 |
| 4 | 0.012 |
| 6 | 0.012 |

To an externally heated 1,000 ml. graduated cylinder of the above type was added 3.3 ml. of 0.1% aqueous anionic polyacrylamide (0.0033 gms. polyacrylamide), having molecular weight of 2,830,000. The cylinder was filled to the 1,000 ml. level with said clear sodium aluminate liquor at 105° C., and the cylinder contents were maintained standing at about 80° – 90° C. for 6.5 hours, without stirring. The liquor in the cylinder was analyzed for $Fe_2O_3$ content periodically during those 6.5 hours, and the results are shown in Table C below.

Table C

| Hours of Standing | Gms. $Fe_2O_3$/Liter Of Clear Liquor |
|---|---|
| 0 | 0.014 |
| 0.5 | 0.008 |
| 2.5 | 0.005 |
| 4.5 | 0.005 |
| 5.5 | 0.005 |
| 6.5 | 0.004 |

EXAMPLE 5

During a period of about 6 years, various bauxite ores, such as Boke, Surinam, Weipa, Tamara, Gove and Guyana, and blends thereof were processed in a commercial size alumina plant having equipment as described in Example 1 above. Either starch or starch mixed with about 0.00024 gram anionic polyacrylamide/liter of mud settler feed slurry was used in the mud settler to accelerate mud settling. The finished (calcined) alumina produced during those six years varied in iron content, but averaged about 0.03% $Fe_2O_3$ content.

For three months the plant was fed blends of bauxite ore ranging from 20 – 50% Guyana and 50 – 80% Boke, with 0.06 gram starch and 0.00024 gram anionic polyacrylamide into the mud settler/liter of mud settler feed slurry. The finished alumina produced during that period averaged about 0.027% $Fe_2O_3$ content. However, the customary practice of working unknown amounts of reclaimed aluminum trihydrate of unknown iron content into the aluminum trihydrate produced during the period in question, prior to calcinating, was followed throughout the time period of this Example 5.

During one month, the plant was fed 45% Guyana and 55% Boke, and the starch-polyacrylamide mixture was replaced with aqueous anionic polyacrylamide having molecular weight of 2,930,000 fed into the mud settler at the rate of 0.00166 gram 100% polyacrylamide/liter of mud settler feed slurry. The calcined alumina produced during that month averaged 0.026% $Fe_2O_3$ content.

During the next 2 months, the plant was fed a blend of 30–33% Guyana and 67–70% Boke, and the above aqueous anionic polyacrylamide going into the mud settler was increased to a rate of 0.0027 gram 100% polyacrylamide/liter of mud settler feed slurry, and aqueous anionic polyacrylamide at the rate of 0.00026 gram 100% polyacrylamide/liter of mud settler feed slurry was fed into the first mud washer. During those 2 months, the $Fe_2O_3$ content of the finished alumina dropped to 0.020 and 0.019%.

During the next month, the plant was fed 50% Guyana and 50% Boke and anionic polyacrylamide having molecular weight 3,370,000 was substituted for the 2,930,000 molecular weight polyarcylamide. Iron content of the finished alumina produced during that month averaged 0.018% $Fe_2O_3$ content.

During the next 4 weeks, the plant was fed 20% Guyana and 80% Boke, and the aqueous anionic polyacrylamide having molecular weight 3,370,000 going into the mud settler was increased to 0.003 gram 100% polyacrylamide/liter of mud settler feed slurry, and the amount of polyacrylamide going into the first mud washer was maintained as above at the rate of 0.00026 gram 100% polyacrylamide/liter of mud settler feed slurry. The calcined alumina produced during that month averaged 0.015% $Fe_2O_3$ content.

During the following 30 days, the plant was fed 100% Boke, except for a blend of 20% Guyana and 80% Boke on 2 days. The polyacrylamide feed to the mud settler was as described in the paragraph just above, but the amount of aqueous anionic polyacrylamide going to the first mud washer was doubled to 0.00052 gram 100% basis polyacrylamide/liter of mud settler feed slurry. The calcined alumina produced during that 30 days had 0.009% $Fe_2O_3$ content, demonstrating substantial iron removal by the process of the present invention.

What is claimed is:

1. In the Bayer process for preparing alumina from bauxite ore, which includes the steps of feeding hot mud settler feed slurry containing alkali metal aluminate liquor, ferrous iron and red mud into a mud settler, and therein separating a portion of the alkali metal aluminate liquor from the red mud, the improvement comprising adding to said slurry 0.003–0.015 gram anionic polyacrylamide per liter of said slurry, said polyacrylamide having molecular weight of at least 2,800,000, and maintaining said slurry and said polyacrylamide in contact, at 65° – 120° C., inclusive, within the mud settler for 4–16 hours, whereby a substantial proportion of the ferrous iron is precipitated with the separated red mud and thereby separating the precipitated ferrous iron from said portion of the alkali metal aluminate liquor.

2. The process of claim 1, wherein the polyacrylamide has molecular weight of 2,800,000 to 5 million, inclusive.

3. The process of claim 1, wherein the polyacrylamide has molecular weight of 4 million to 5 million, inclusive.

4. The process of claim 3, wherein the contacted slurry and polyacrylamide are devoid of starch and the alkali is sodium.

5. The process of claim 1, wherein the contacted slurry and polyacrylamide are devoid of starch.

6. The process of claim 1, and wherein the alkali is sodium.

7. In the Bayer process for preparing alumina from bauxite ore, which includes the steps of feeding hot mud settler feed slurry containing alkali metal aluminate liquor, ferrous iron and red mud into a mud settler; separating a first portion of the alkali metal aluminate liquor from the red mud; and washing the red mud with wash water to recover, for recycling in the Bayer process, a second portion of alkali metal aluminate liquor, the improvements comprising adding to said slurry 0.003 – 0.015 gram anionic polyacrylamide per liter of said slurry, said polyacrylamide having molecular weight of at least 2,800,000, and maintaining said slurry and said polyacrylamide in contact, at 65° – 120° C., inclusive within the mud settler for 4–16 hours whereby a substantial proportion of the ferrous iron is precipitated and settled out with the separated red mud and thereby separating the precipitated ferrous iron from said first portion of the alkali metal aluminate liquor; and maintaining 0.0013–0.015 gram anionic polyacrylamide per liter of wash water, said polyacrylamide having molecular weight of at least 2,800,000, in the wash water to lessen the amount of precipitated ferrous iron which the wash water would otherwise remove from the red mud.

8. The process of claim 7, wherein the polyacrylamide has molecular weight of 2,800,000 to 5 million, inclusive.

9. The process of claim 7, wherein the polyacrylamide has molecular weight of 4 million to 5 million, inclusive.

10. The process of claim 9, wherein the contacted mud settler feed slurry and polyacrylamide are devoid of starch; and the alkali is sodium.

11. The process of claim 7, wherein the contacted slurry and polyacrylamide are devoid of starch.

12. The process of claim 7, and wherein the alkali is sodium.

13. In the Bayer process for preparing alumina from bauxite ore, which includes the step of producing clear alkali metal aluminate liquor containing ferrous iron as mud settler overflow, the improvement comprising maintaining said liquor and 0.0013 – 0.015 gram anionic polyacrylamide per liter of clear alkali metal aluminate liquor, said polyacrylamide having molecular weight of at least 2,800,000, in contact, at 65° – 254° C., inclusive, for 4–16 hours whereby a substantial proportion of the ferrous iron is precipitated, and separating the precipitated ferrous iron from the alkali metal aluminate liquor.

14. The process of claim 13, wherein the polyacrylamide has molecular weight of 2,800,000 to 5 million, inclusive.

15. The process of claim 14, wherein the alkali is sodium; and the liquor and the polyacrylamide remain in contact at 65° – 99° C.

16. The process of claim 13, wherein the polyacrylamide has molecular weight of 4 million to 5 million, inclusive.

17. The process of claim 13, wherein the contacted liquor and polyacrylamide are devoid of starch.

18. The process of claim 13, wherein the alkali is sodium.